Sept. 30, 1958

M. B. LUCKER ET AL 2,854,097

DISC BRAKE WITH COMBINED SELF-ADJUSTER
AND TORQUE-ABSORPTION MEANS

Filed May 17, 1954

INVENTORS.
M. B. Lucker
C. R. Meyers
R. R. Zindler
By: Robert Cobb, Attys.

INVENTORS.
M. B. Lucker
C. R. Myers
R. R. Zindler
By: Robert Cobb, atty.

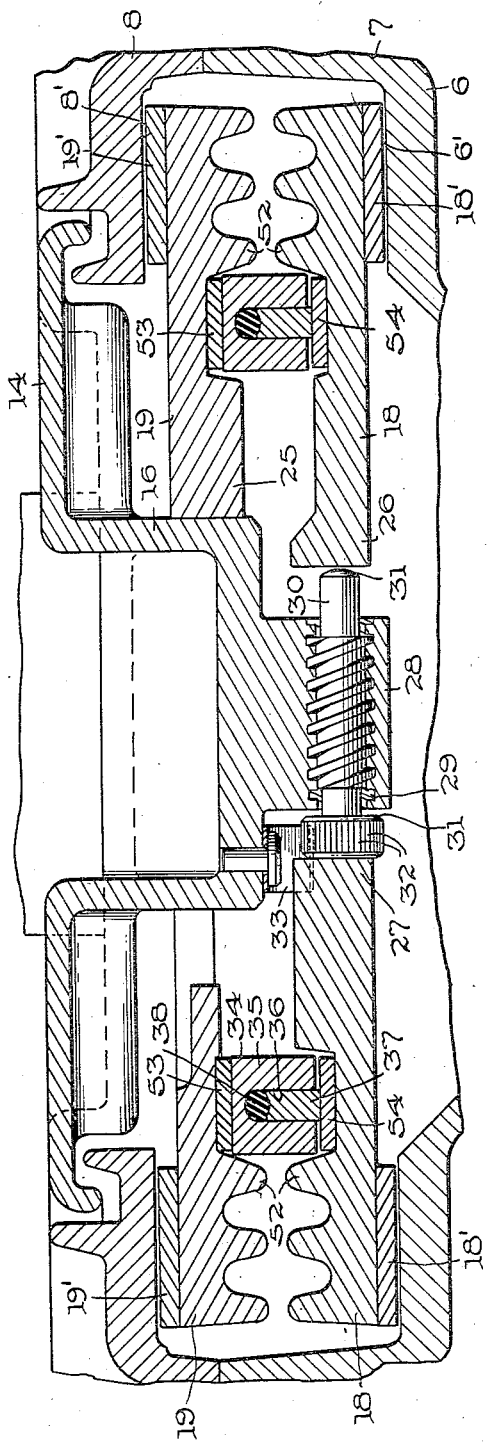

United States Patent Office 2,854,097
Patented Sept. 30, 1958

2,854,097

DISC BRAKE WITH COMBINED SELF-ADJUSTER AND TORQUE-ABSORPTION MEANS

Millard B. Lucker, St. Joseph, Claude R. Myers, Galien, and Roger R. Zindler, St. Joseph, Mich., assignors, by mesne assignments, to Lambert Brake Corporation, St. Joseph, Mich., a corporation of Michigan Application May 17, 1954, Serial No. 430,094

10 Claims. (Cl. 188—72)

The present invention relates to disc brakes, and more particularly to an improved disc brake having means for automatically adjusting the brake to maintain a constant release clearance for the brake throughout its life, said adjuster means also serving to absorb braking torque imparted to one of the brake discs during brake applications, while another disc remains free for braking torque-responsive rotative movement to effect self-energization of the brake.

Certain types of well-known disc brakes include a pair of relatively rotatable and axially shiftable discs or plates which are adapted to frictionally engage a rotary member to be braked upon initial actuation. When the rotary member is rotating in one direction, one or the other of the discs anchors on a fixed member, while the other disc remains free for torque-responsive rotation with the rotary member to effect self-energization of the brake by a camming action produced by camming means interposed between the discs. Heretofore, this type of brake has been subject to objectionable "clunking" noises as the discs are caused to shift into anchoring engagement with the fixed member, particularly upon initial brake application after reversal of the direction of rotation of the rotary member to be braked. Various means have been utilized in an effort to overcome these objectionable clunking noises, including such means as resilient or fluid cushions adapted to absorb the anchoring movements of the discs to thereby eliminate the clunk, and while these cushions have been effective to substantially eliminate the noise, they do not eliminate the cause of the same.

An object of the present invention is to provide an improved brake of the aforesaid type which includes novel means for anchoring the discs against torque-responsive rotation, whereby the respective discs are both initially in contact with an anchor upon brake applications, thus avoiding the necessity of one disc shifting into engagement with an anchor according to the direction of rotation of the rotary member and regardless of reversals in the direction of rotation thereof.

Another object is to provide such a disc brake wherein automatic adjuster means are employed to not only maintain a constant release clearance for the brake, but to also function as an anchor means for absorbing braking torque transmitted from the rotary member to one of the discs, this self-adjuster means including a one-way shiftable member which is engaged by a portion of one of the discs to shift the member in one direction upon rotation of the disc in one direction, and which is engaged by another portion of the disc to prevent rotation of the disc in the opposite direction, and the other of said discs being adapted for slight rotation in one direction only during brake applications.

A further object is to provide a disc brake which includes a stationary support on which a pair of friction discs or plates is mounted for relative rotative and axial movements into frictional engagement with the rotary element to be braked, said stationary support and one of said plates having cooperative automatic adjuster means for permitting said plate to rotate slightly in one direction, but anchoring said plate against rotation in the other direction, and resilient means biasing said plate away from the rotary element and maintaining the plate anchored.

Still another object is to provide a disc brake according to the next preceding paragraph, in which the other of said plates is provided with means for anchoring the same on said stationary member against rotation in the direction in which the first-mentioned plate is rotatable, and the resilient means biases said plates to anchorage in opposite directions.

Specifically, an object is to provide a disc brake comprising a rotary housing having opposed, radially extended friction surfaces therein disposed in axially spaced relation, a stationary support disposed at one side of said housing, an inner double-disc assembly disposed within said housing and supported upon said stationary support, an adjuster member carried by said support and engaged with one of said discs to permit said disc to rotate slightly in one direction and to prevent said disc from rotating in the other direction, the other disc having an anchor portion engageable with said support to prevent rotation of the latter disc in the direction of rotation of the first-mentioned disc, camming balls between the discs to effect self-energization of the brake responsive to slight rotative movement of one disc relative to the other, depending upon the direction of rotation of the housing, means biasing said discs towards one another and acting to maintain both of said discs anchored when the brake is released, and actuator means for shifting the discs to engagement with the housing.

Another object is to provide a disc brake according to the foregoing objectives, which includes an annular hydraulic actuator cylinder between the discs, said actuator cylinder including an annular cylinder body freely mounted between the discs, said cylinder body having an annular piston chamber therein, and a reciprocable piston in said piston chamber, said body being engaged with one disc and said piston being engaged with the other disc to spread said discs axially apart into engagement with the housing upon expansion of the actuator cylinder.

Other objects and advantages of the invention will be hereinafter described or will become apparent to those skilled in the art, and the novel features thereof will be defined in the appended claims.

In the drawings:

Fig. 3 is an enlarged view in section, as taken on the line 3—3 of Fig. 1, with certain of the parts shown in elevation; and Fig. 4 is a view in section, as taken on the line 4—4 of Fig. 2, with certain of the parts shown in elevation.

Like reference characters in the several figures of the drawings and in the following description designate corresponding parts.

Figure 1:
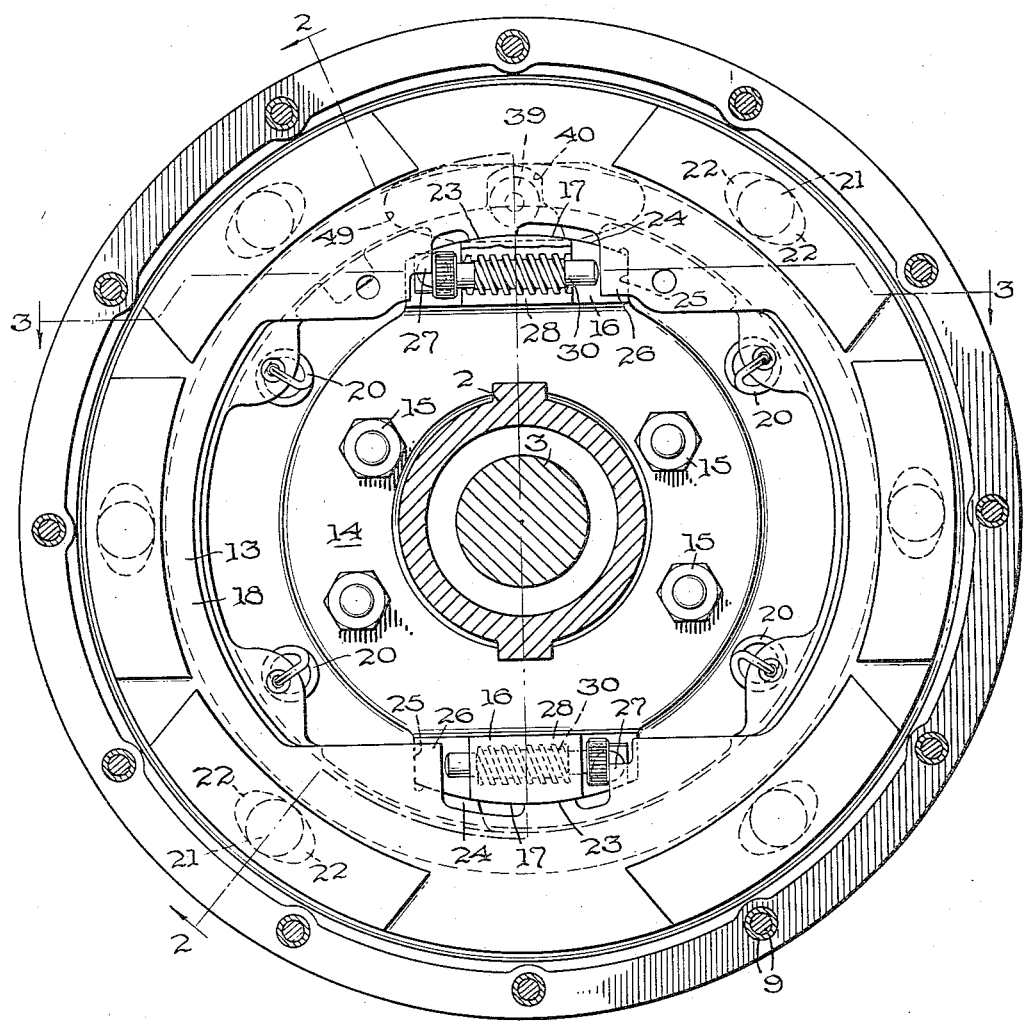
Fig. 1 is a view partly in section and partly in side elevation of a brake embodying the present invention, with the outboard side of the housing removed to disclose the interior construction, this view being a section, as taken substantially on the line 1—1 of Fig. 2.
Figure 2:
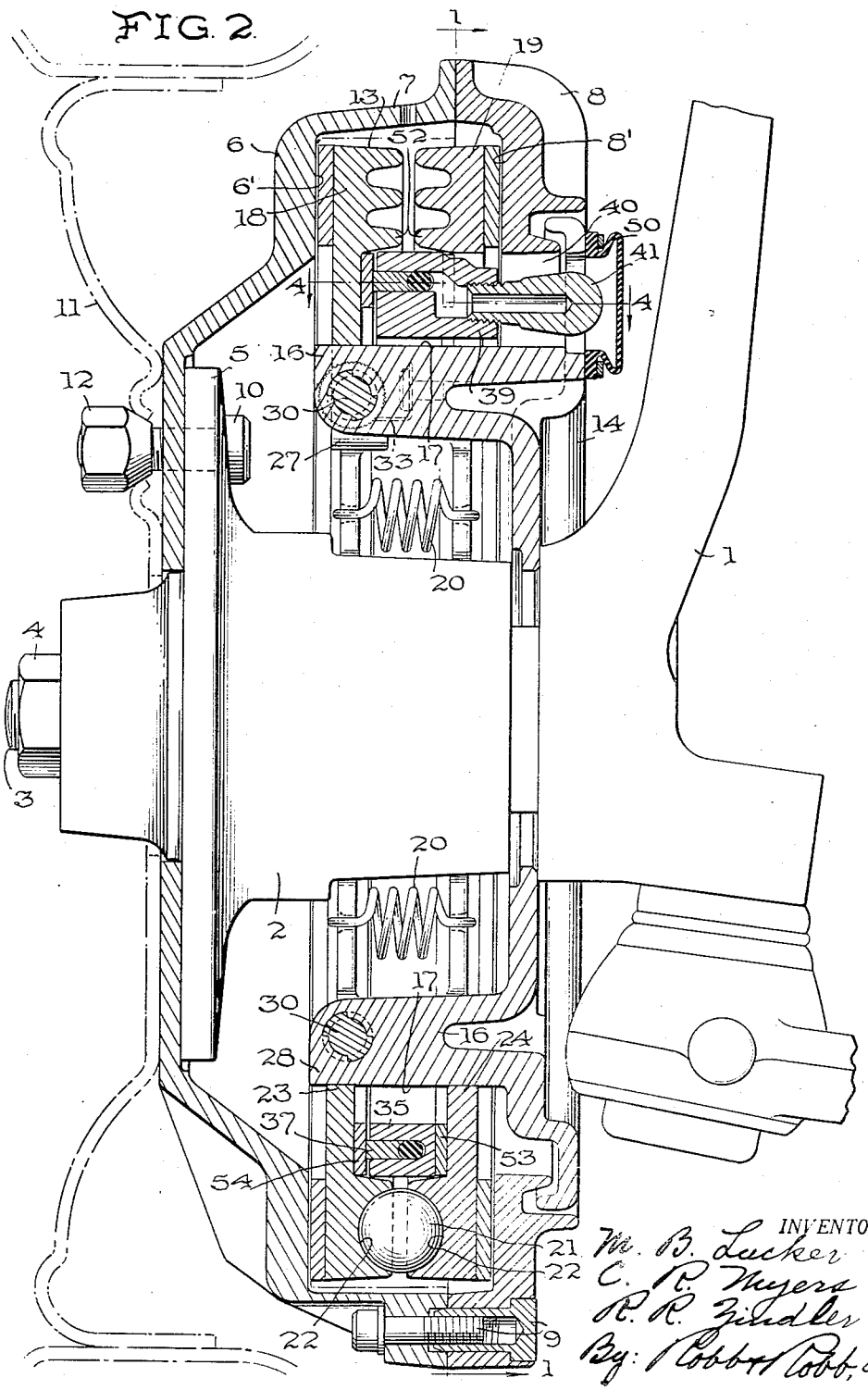
Fig. 2 is an enlarged view in section, as taken on the line 2—2 of Fig. 1, with certain of the parts shown in elevation.

The brake of this invention is adapted for use in connection with the front and rear wheels of a motor vehicle, and is adapted for installation on either the righthand or lefthand side of the vehicle, and for illustrative purposes, the brake shown in the drawings is shown in association with a left front wheel support 1 having a wheel-mounting hub 2 rotatably journalled upon a spindle 3 and secured thereon as by means of a nut 4. The wheel-mounting hub 2 is provided with a radially extended flange 5 to which is secured an outboard housing section 6 of a hollow brake housing generally designated 7, the outboard housing section 6 having an inboard housing section 8 secured thereto about the outer periphery of the respective housing sections, as by means of a plurality of screws and recessed nuts, as at 9. A suitable number of wheel-supporting bolts 10 extend through the radial flange 5 and the outboard housing section 6, these bolts 10 being adapted to secure a wheel 11 to the flange 5, with a nut 12 threaded on each screw 10 and clamping the housing section 6 and the wheel 11 between the nut 12 and the flange 5 on the wheel-supporting hub 2.

Interiorly of the housing 7, the housing sections 6 and 8 are respectively provided with radially extended, axially spaced, opposed friction surfaces 6' and 8'. The friction surfaces 6' and 8' are adapted to be frictionally engaged by an inner double-disc assembly generally designated 13 which will hereinafter be more fully described and which is supported upon a backing or adapter plate 14 which is rigidly annexed to the wheel-supporting structure 1, as by means of a suitable number of screws 15.

The backing plate 14 is preferably cast as an annular plate having a pair of diametrically opposed, axially extended lugs 16, 16 extending into the housing 7. Each lug 16 is provided with an arcuate outer face 17 formed on an arc concentric with the brake assembly, upon which the inner double-disc assembly 13 is mounted.

The inner double-disc assembly 13 includes a pair of discs 18 and 19, these discs being secured together by means of a plurality of brake release or return springs 20, and a plurality of camming balls 21 each disposed in opposed, oppositely inclined ramped seats 22, 22 formed in the opposed inner faces of the respective discs 18 and 19, maintain the discs in axially spaced and concentric relation with respect to one another. The disc 18 constitutes an outboard disc or plate and is formed about its inner periphery with a pair of radially projecting bearing lugs or projections 23 adapted for complemental bearing contact with the arcuate surfaces 17 on the supporting lugs 16 of the backing plate 14. The disc or plate 19, which constitutes an inboard disc, is also formed about its inner periphery with a pair of radially projecting bearing lugs or projections 24 adapted to support the inboard disc 19 upon the supporting lugs 16 of the backing plate 14. Disposed adjacent to each bearing projection 24 on the inboard disc 19 and projecting further inwardly from the disc is an anchor lug 25 adapted to anchor against the adjacent side wall of the respective supporting lugs 16 and 16 to anchor the inboard disc 19 against rotation in a counter-clockwise direction as viewed in Fig. 1, while the disc 19 remains free for rotation in the opposite direction. The outboard disc 18 is provided with two pair of inwardly extending lugs respectively designated 26 and 27, each lug 26 being disposed in opposite spaced relation to a lug 27, and the lugs 16 on the backing plate 14 are each formed with a reduced extension 28 disposed between the lugs 26 and 27 in spaced relation thereto. As will hereinafter more fully appear, the lugs 26 on the outboard disc 18 constitute adjuster lugs, and the lugs 27 on this disc constitute anchor lugs adapted to anchor the outboard disc 18 against rotation in a clockwise direction, as viewed in Fig. 1 while allowing the outboard disc to rotate slightly in a counter-clockwise direction.

Each of the extensions 28 of the supporting lugs 16 is provided with a threaded bore 29 in which is threadedly supported a combined self-adjuster and torque-absorption screw 30, the screws 30 being each provided with a rounded lead end 31 adapted to be engaged by the respective adjuster lugs 26 on the outboard disc 18. Each screw 30 is also preferably provided with a head 31 adapted to be engaged by the anchor lugs 27 on the outboard disc 18, the outer periphery of each screw head 31 preferably being formed with a plurality of circumferentially spaced notches or teeth 32, and each supporting lug 16 having carried thereby a spring pawl or dog 33 adapted to engage in the teeth 32 to limit the respective screws to rotation in one direction only.

The discs 18 and 19 are adapted for frictional engagement with the inner friction surfaces 6' and 8' of the housing 7, and each of the discs is preferably provided with a suitable number of segments of friction lining material respectively designated 18' and 19' on the outboard and inboard discs. Means are provided for shifting the discs into frictional contact with the housing, and preferably in the form of an annular hydraulic actuator device 34 which includes an annular cylinder 35 having a piston chamber 36 therein. Disposed in the piston chamber 36 is an annular piston 37 which projects outwardly of the cylinder 35, and inwardly of the piston 37, the chamber 36 is adapted to be sealed by means of an O-ring seal 38. For admitting fluid under pressure into the piston chamber 36 to shift the piston and cylinder relatively axially in a direction to spread the discs 18 and 19 apart, the cylinder 35 is provided with an axially extending hollow neck 39 which projects through an opening or depression 40 in the inboard disc 19, as is best seen in Fig. 4. Threadedly mounted in this hollow neck 39 is a fitting 41 having a fluid passage 42 for establishing communication through the hollow neck 39 with the piston chamber 36, this passage 42 being connected with a bleed passage 43 in an arm 44 of the fitting 41, and also being connected with a passage 45 in an arm 46; this passage 45 constitutes an inlet-outlet passage for brake actuating fluid. The arm 44 is preferably provided in the outer end thereof with a conventional bleeder valve 47, and the arm 46, at its outer end, is adapted to be coupled with a fluid conduit as at 48, this fluid conduit leading from a source of fluid under pressure, such as a conventional master cylinder (not shown) with which the present day motor vehicles are usually equipped. The fitting 41 projects through a longitudinally extended opening 49 through the backing plate 14, whereby the inboard disc 19 is free for rotation in one direction, as aforementioned, and in order to prevent foreign matter from entering the housing 7, the opening 49 is preferably sealed by means of a resilient dust cap 50 which is secured to the backing plate 14, as by means of a suitable number of screw fasteners 51, and which sealingly engages about the bleeder valve 47 and the conduit for the hydraulic actuating fluid.

Preferably, the annular actuator device 34 is freely mounted and floats between the discs 18 and 19, and the opposed inner faces of the discs 18 and 19 are each provided with a flange 52, these flanges 52 and 52 extending towards one another and constituting means for centering the actuator 34 concentrically with relation to the discs 18 and 19. These flanges 52 also provide the discs 18 and 19 with more surface area for the dissipation of heat during brake applications. In order to prevent the transmission of such heat from the discs to the fluid in the hydraulic actuator cylinder 34, an insulating ring 53 is interposed between the cylinder body 35 and the inboard disc 19, and another insulating ring 54 is interposed between the piston 37 and the outboard disc 18, these insulating rings 53, 54 being freely mounted between the actuator cylinder and the actuator piston and the respective discs.

The operation of the brake above described is as follows:

The brake is shown as being in a released condition, with the housing 7 free to rotate with the vehicle wheel, and to engage the brake, fluid under pressure will be supplied from the above-mentioned master cylinder to the actuator device 34, causing an expansion thereof which will shift the discs 18 and 19 axially apart against the tension of return springs 20. Assuming the housing to be rotating in a counter-clockwise direction, and thus the vehicle to be moving in a forward direction, since the illustrated brake is shown in connection with the left front wheel of the vehicle, the inboard disc 19 which is anchored by its lug 25 on the supporting lug 16 of the backing plate 14 will remain fixed against rotation in the direction of rotation of the housing, while the outboard disc 18 will be free to "clock" or rotate slightly with the housing 7 in a counter-clockwise direction. This rotation of the disc 18 relative to the disc 19 will effect the camming action of the balls 21 in the opposed seats 22, thereby forcing the discs into harder frictional engagement with the inner friction faces 6' and 8' of the housing 7 with a powerful self-energization. However, it will be noted that, as the friction lining segments 18' and 19' wear down, the outboard disc 18 will have to rotate increasingly greater distances relative to the inboard disc 19 in order to fully apply the brake. As the outboard disc 18 tends to shift further relative to the inboard disc 19, the adjuster lugs 26 come into contact with the rounded ends 31 of the adjuster screws 30 and progressively force the screws 30 to rotate and move in a corresponding direction in their threaded supports 28. Upon release of the brake, the return springs 20 will urge the discs towards one another and cause the balls 21 to ride down the opposed ramps 22 until the anchor lugs 27 on the disc 18 abut with the heads 31 of the screws 30, and by reason of the fact that the screws 30 constitute one-way shiftable members, the disc 18 can only rotate in a clockwise direction, as viewed in Fig. 1, that slight amount represented by the small gap between the rounded end 31 of the screws and the adjacent face of the adjuster lugs 26. Frictional contact of the anchor lugs 27 with the ends of the screw heads 31 will substantially prevent thrust imparted to the screws 30 from the anchor lugs 27 from causing the screws 30 to rotate, but the spring pawls or dogs 33 positively preclude such rotation of the screws 30.

Thus, it will be noted that automatic adjustment of the brake is progressively accomplished as the brake is applied. It should also be noted that, as the brake progressively adjusts, the anchor lugs 27 are biased into close abutting contact with the screw heads 31, and the anchor lugs 25 on the inboard disc 19 are biased into close abutting or anchoring contact with the supporting lugs 16 on the backing plate 14 by the release action of the release springs 20 which pull the discs towards one another and cause the discs to be urged rotatively in opposite directions through the action of the balls 21. Therefore, whenever the brake is released, the anchor lugs 25 on the inboard disc 19 are always in anchoring contact with the supporting lugs 16, and the anchor lugs 27 on the outboard disc 18 are always in anchoring engagement with the screw heads 31, whereby, when the brake is applied, one disc is anchored while the other disc is free for rotation, irrespective of the direction of rotation of the housing 7. Accordingly, no objectionable noise is produced by one disc or the other shifting to anchorage, as is occasioned in prior brakes of the type hereinbefore mentioned, and this is true even upon reversal of the direction of rotation of the housing 7.

In other words, when the brake is released, there is no clearance between the anchor lugs 25 and 27 on the discs 19 and 18, respectively, and the respective contiguous faces of the supporting lugs 16 on the backing plate 14 and the screw heads 31, and the inner double-disc assembly is never free to shift rotatively as a unit as in the case in the previously mentioned double-disc brakes.

It will be recognized from the foregoing that the discs 18 and 19 of the double-disc assembly 13 constitute a pair of plates which, when the brake is released, are so mounted and arranged that one of the discs is free to rotate slightly relative to the other to effect axial separation of the plates, and therefore, it will be readily understood that, without departing from the invention herein, the disc 18 may be utilized as a friction disc, while the disc 19 merely constitutes a stationary plate against which the actuator device and the camming balls are operative to shift the disc 18 into frictional contact with a rotary member to be braked. Therefore, in the following claims, unless both of the discs or plates are specifically defined as being friction discs or plates, it is to be understood that both of the discs or plates need not necessarily have the function of frictionally engaging the rotary housing or member to be braked.

Other changes and alterations in the invention herein specifically shown and described may be resorted to without departing from the spirit thereof as defined in the appended claims.

We claim:

1. A disc brake of the class described, comprising a rotary element to be braked, a stationary supporting member, a pair of friction plate members shiftably mounted on said supporting member for movement into and out of engagement with said rotary element and for slight rotative movements, actuator means operatively associated with said plates for shifting said plates into engagement with said rotary element, release means operatively associated with said plates for shifting said plates away from said rotary element, torque-responsive camming means operative to force said plates into engagement with said rotary element responsive to rotation one of the plates with the rotary element upon rotation of the latter element in either direction, means for anchoring one plate against rotation in one direction, and means for anchoring the other plate against rotation in the other direction, said anchoring means including combined adjusted and torque-absorption means for maintaining a constant release clearance between said plates and said rotary element upon release of said actuator means, said combined adjuster and torque-absorption means comprising a one-way shiftable member mounted on said stationary support, means for automatically adjusting said one-way shiftable member responsive to brake applications including an abutment on one of said plates engageable with one end of said one-way shiftable member to shift the same in one direction responsive to rotation of said latter plate in one direction, means for locking said one-way shiftable member against movement in the other direction, and another abutment on said latter plate engageable with the other end of said one-way shiftable member to prevent rotation of said plate in the other direction.

2. A disc brake of the class described, comprising a rotary element to be braked, a stationary supporting member, a pair of friction plate members shiftably mounted on said supporting member for movement into and out of engagement with said rotary element and for slight rotative movements, actuator means operatively associated with said plates for shifting said plates into engagement with said rotary element, release means operatively associated with said plates for shifting said plates away from said rotary element, torque-responsive camming means operative to force said plates into engagement with said rotary element responsive to rotation of one of the plates with the rotary element upon rotation of the latter element in either direction, means for anchoring one plate against rotation in one direction, and means for anchoring the other plate against rotation in the other direction, said anchoring means including combined adjuster and torque-absorption means for maintaining a constant release clearance between said plates and said rotary element upon release of said actuator means, said combined adjuster and torque-absorption means comprising a one-way shiftable element carried by one of said members, means for automatically adjusting said one-way shiftable element responsive to brake applications including an abutment on the other of said members engageable with one end of the one-way shiftable element to shift the same in one direction responsive to relative movement in one direction between said members, means for locking said one-way shiftable element against movement in the other direction, and another abutment on the latter member engageable with the other end of said one-way shiftable element to prevent relative movement in the opposite direction between said members.

3. A disc brake of the class described, comprising a rotary housing to be braked, said housing having opposed, axially spaced and radially extended friction surfaces therein, a stationary support, an inner double-disc assembly disposed in said housing and mounted on said stationary support, said double-disc assembly including a pair of relatively rotatable and axially shiftable friction discs, actuator means for shifting said discs axially into initial engagement with said friction surfaces of the housing, camming means between said discs for forcing the discs into engagement with said friction surfaces responsive to slight rotation of one disc relative to the other, resilient brake release means biasing said discs towards one another, and torque-absorption means for selectively anchoring the respective discs on said stationary support against rotation while allowing limited rotation of the other disc, said torque-absorption means including self-adjuster means cooperatively engaged with said stationary support and one of the said discs, said self-adjuster means comprising a one-way shiftable member carried by said support, an adjuster lug carried by said one of the discs and engageable with one end of the one-way shiftable member to shift the same upon rotation of the disc in one direction, and an anchor lug on said one of the discs engageable with the other end of said one-way shiftable member to anchor the disc against rotation in the opposite direction.

4. A disc brake of the class described, comprising a rotary housing to be braked, said housing having opposed, axially spaced and radially extended friction surfaces therein, a stationary support, an inner double-disc assembly disposed in said housing and mounted on said stationary support, said double-disc assembly including a pair of relatively rotatable and axially shiftable friction discs, actuator means for shifting said discs axially into initial engagement with said friction surfaces of the housing, camming means between said discs for forcing the discs into engagement with said friction surfaces responsive to slight rotation of one disc relative to the other, resilient brake release means biasing said discs towards one another, and torque-absorption means for selectively anchoring the respective discs on said stationary support against rotation while allowing limited rotation of the other disc, said torque-absorption means including self-adjuster means cooperatively engaged with said stationary support and one of the said discs, said torque-absorption means comprising an anchor lug on one disc engageable with said support to prevent rotation of the disc in one direction, and an anchor lug on the other disc engageable with said self-adjuster means to prevent rotation of the latter disc in the other direction.

5. A disc brake of the class described, comprising a rotary housing to be braked, said housing having opposed, axially spaced and radially extended friction surfaces therein, a stationary support, an inner double-disc assembly disposed in said housing and mounted on said stationary support, said double-disc assembly including a pair of relatively rotatable and axially shiftable friction discs, actuator means for shifting said discs axially into initial engagement with said friction surfaces of the housing, camming means between said discs for forcing the discs into engagement with said friction surfaces responsive to slight rotation of one disc relative to the other, resilient brake release means biasing said discs towards one another, and torque-absorption means for selectively anchoring the respective discs on said stationary support against rotation while allowing limited rotation of the other disc, said torque-absorption means including self-adjuster means cooperatively engaged with said stationary support and one of the said discs, said stationary support being provided with a lug on which said discs are mounted, the torque-absorption means for one of said discs including an anchor lug normally engaged with the lug on said support, the self-adjuster means comprising a screw threadedly supported in the lug on said support, and the torque-absorption means for the other of said discs including an anchor lug normally engaged with one end of said screw.

6. A brake of the class described, comprising a stationary support, a double-disc assembly mounted on said support, anchor means on said disc assembly and on said support for preventing rotary movement of said disc assembly as a whole, said disc assembly including a pair of relatively rotatable and axially shiftable friction plates, resilient means biasing said plates towards one another, camming means between said plates for moving said plates axially apart upon relative rotation thereof and, in conjunction with said resilient means, for maintaining the anchor means aforesaid in anchoring engagement when the brake is released, said anchor means including an adjuster member carried by said support, and an anchor lug on one of the plates engageable with said adjuster member, a rotary member to be braked, and actuator means for shifting said plates into engagement with said rotary member.

7. A brake of the class described, comprising a stationary support, a disc assembly mounted on said support, anchor means on said disc assembly and on said support for preventing rotary movement of said disc assembly as a whole, said disc assembly including a pair of relatively rotatable and axially shiftable friction plates, resilient means biasing said plates towards one another, camming means between said plates for moving said plates axially apart upon relative rotation thereof and, in conjunction with said resilient means, for maintaining said plates anchored on said support when the brake is released, said anchor means including a pair of cooperative anchor lugs respectively on said support and on one of the plates, an anchor lug on the other of said plates, and self-adjuster means on the support and engageable with the last-mentioned anchor lug, a rotary member to be braked, and actuator means for shifting said plates into engagement with said rotary member.

8. A brake of the class described, comprising a rotary housing to be braked having opposed, axially spaced friction surfaces therein, a stationary member, supporting means on said stationary member, an inner double-disc assembly mounted on said supporting means and including a pair of relatively rotatable and axially shiftable discs, camming means between said discs for shifting the discs axially apart responsive to slight rotation of one of said discs with said housing upon frictional engagement of the discs with the housing, actuator means for shifting said discs into engagement with the housing, and resilient release means biasing said discs towards one another, said supporting means including a stationary abutment forming an anchor on one side thereof, one of said discs having an anchor lug in engagement with said anchor, said abutment being provided with an extension having an anchor at the opposite side of the supporting means from said abutment anchor, the other of said discs having an anchor lug in engagement with the anchor of said extension, and adjustable means for varying the distance between said anchors.

9. A brake as defined in claim 8, wherein the means for varying the distance between the anchors comprises a shiftable member carried by said supporting means, one of said anchors being formed by said shiftable member.

10. A brake as defined in claim 8, wherein the means for varying the distance between the anchors comprises a one-way shiftable member extending through said supporting means, one of said anchors being formed by one end of said one-way shiftable member, and the disc which anchors on said one-way shiftable member having an adjuster lug engageable with the other end of said one-way shiftable member to shift the same responsive to rotation of the latter disc in one direction.

References Cited in the file of this patent

UNITED STATES PATENTS

| | | |
|---|---|---|
| 2,320,286 | Lambert | May 25, 1943 |
| 2,375,854 | Lambert | May 15, 1945 |
| 2,563,759 | Tiscornia et al. | Aug. 7, 1951 |
| 2,607,442 | Lucker et al. | Aug. 19, 1952 |
| 2,633,943 | Lambert | Apr. 7, 1953 |
| 2,799,366 | Zindler | July 16, 1957 |